United States Patent
Wang et al.

(10) Patent No.: US 12,093,117 B2
(45) Date of Patent: Sep. 17, 2024

(54) TWO-SIDED TIME-SHARING DRIVING AND ACQUISITION SYSTEM BASED ON DRY CONTACTS AND SYSTEM FAULT DETECTION METHOD THEREFOR

(71) Applicants: Jiangsu Huachuang Microsystem Company Limited, Nanjing (CN); Nanjing Research Institute of Electronics Technology, Nanjing (CN)

(72) Inventors: Yue Wang, Nanjing (CN); Yu Zheng, Nanjing (CN); Kun Qi, Nanjing (CN); Dingliang Xu, Nanjing (CN); Yong Qi, Nanjing (CN); Guoqiang He, Nanjing (CN)

(73) Assignees: Jiangsu Huachuang Microsystem Company Limited, Nanjing (CN); Nanjing Research Institute of Electronics Technology, Nanjing (CN)

( * ) Notice: Subject to any disclaimer, the term of this patent is extended or adjusted under 35 U.S.C. 154(b) by 21 days.

(21) Appl. No.: 18/116,348

(22) Filed: Mar. 2, 2023

(65) Prior Publication Data
US 2023/0401119 A1  Dec. 14, 2023

(30) Foreign Application Priority Data
Jun. 10, 2022 (CN) .......................... 202210657897.X

(51) Int. Cl.
G06F 11/07 (2006.01)
(52) U.S. Cl.
CPC ...... *G06F 11/0736* (2013.01); *G06F 11/0724* (2013.01); *G06F 11/0772* (2013.01); *G06F 11/0793* (2013.01)

(58) Field of Classification Search
CPC ............ G06F 11/0736; G06F 11/0724; G06F 11/0772; G06F 11/0793
See application file for complete search history.

(56) References Cited

U.S. PATENT DOCUMENTS

| | | | |
|---|---|---|---|
| 11,431,323 B2 * | 8/2022 | Haberstroh | ........ H03H 17/0621 |
| 2024/0097556 A1 * | 3/2024 | Kakebe | ................... H02M 1/08 |

FOREIGN PATENT DOCUMENTS

| | | | | |
|---|---|---|---|---|
| CN | 203551711 U | | 4/2014 | |
| EP | 3656640 A1 * | | 5/2020 | ............... B61L 5/06 |
| GB | 2517368 A * | | 2/2015 | ............ H01H 47/00 |
| WO | WO-2019238144 A1 * | | 12/2019 | ............ G11C 19/28 |

* cited by examiner

*Primary Examiner* — Joseph O Schell
*Assistant Examiner* — Indranil Chowdhury
(74) *Attorney, Agent, or Firm* — Bayramoglu Law Offices LLC

(57) ABSTRACT

A two-sided time-sharing driving and acquisition system based on dry contacts comprises k dry contacts, a processor, p acquisition circuits, and m driving circuits. The p acquisition circuits are evenly divided into two groups which are separately disposed at two sides of the k dry contacts. The m driving circuits are separately disposed at the two sides of the k dry contacts. A system fault detection method and the two-sided time-sharing driving and acquisition system have the following advantages: the state of input acquisition circuits and cables monitored in real time during system debugging or running, and faults caused by exceptions of the acquisition circuits and the cables can be reported in time.

12 Claims, 5 Drawing Sheets

TWO-SIDED TIME-SHARING DRIVING AND ACQUISITION SYSTEM BASED ON DRY CONTACTS AND SYSTEM FAULT DETECTION METHOD THEREFOR This application claims priority of Chinese application No. 202210657897.X, filed on Jun. 10, 2022, the entire content of which is incorporated herein by reference.

TECHNICAL FIELD

The invention relates to a two-sided time-sharing driving and acquisition system based on dry contacts and a system fault detection method therefor.

BACKGROUND

On the spot of industry or in the field of rail transit, state signals of a large number of relay dry contacts need to be accurately acquired in real time by a system. In reliability design of existing systems, input signals to be acquired are regarded as correct by default, so only one acquisition circuit is designed conventionally, and a redundant acquisition circuit may be added in some occasions with high reliability requirements. Such design has the disadvantages that circuit faults and misconnection of cables cannot be monitored and reported in real time during system running, so possible wiring errors or short-circuit faults caused by aging and cable damage caused by vibrations, rodent gnawing and rainwater erosion may be overlooked in actual working conditions. Because the cables at acquisition points are of different types and large in number, once these exceptions occur, they cannot be detected in time during system running, resulting in serious consequences.

Upon search, Chinese Invention Patent Application No. CN 203551711 U discloses a cable misconnection detection circuit for input-output channels, which needs an extra system, has too many interfaces, and is high in cost; in addition, the system has to be stopped for detection, and exceptions of acquisition circuits or cables cannot be detected during normal running of the original system.

SUMMARY

The invention provides a two-sided time-sharing driving and acquisition system based on dry contacts, comprising k dry contacts, a processor, p acquisition circuits and m driving circuits, wherein the k dry contacts are mutually independent, k, p and m are all positive integers, m≤p, and p=2k; the k dry contacts are mutually independent, the p acquisition circuits are evenly divided into two groups which are separately disposed at two sides of the k dry contacts, and the m driving circuits are separately disposed at the two sides of the k dry contacts;

An output of one driving circuit is accessed to each of the two sides of each dry contact, driving signals at the two sides of each dry contact are from two driving circuits separately, and the driving circuits at the two sides of each dry contact do not drive output signals at the same time; one acquisition circuit is connected to each of the two sides of each dry contact, and the two acquisition circuits connected to each dry contact are independent of each other and are used for acquiring output signals of the corresponding driving circuits at the two sides of the dry contact respectively;

The processor controls outputs of the m driving circuits at different times and synchronously reads signals acquired by the p acquisition circuits; if the output signal of the driving circuit at either side of one dry contact is acquired by the two corresponding independent acquisition circuits, the system determines that the dry contact is in a close state; if the output signal of the driving circuit at either side of one dry contact is acquired only by the acquisition circuit at the same side, the system determines that the dry contact is in an open state; and in other cases, the system determines that a fault occurs.

Further preferably, the m driving circuits are disposed at the two sides of the k dry contacts, the two sides of the k dry contacts are defined a side A and a side B respectively, a driving circuits are disposed on the side A, b driving circuits are disposed on the side B, and a and b are positive integers; each driving circuit is configured to drive one or more signals to be output, and in a case where one driving circuit outputs a signal, the acquisition circuits connected to the corresponding contact are able to detect the signal output by the driving circuit; and at the side A, if one driving circuit drives x signals to be output at the same time, the driving circuits at the side B of the x dry contacts should be driven separately.

Further preferably, m is configured to meet a*b≥p to reduce the complexity and cost of the system.

Further preferably, m is optimally configured to meet a+b=m.

The invention provides a system debugging fault detection method for a two-sided time-sharing driving and acquisition system based on dry contacts, comprising the following steps:

S11: powering on the system;
S12: opening k dry contacts;
S13: controlling, by a processor, outputs of m driving circuits at different times, and synchronously reading, by the processor, signals acquired by p acquisition circuits;
S14: determining whether the system has a fault; if so, performing SI1; otherwise, performing S15;
S15: closing the k dry contacts;
S16: controlling, by the processor, outputs of the m driving circuits at different times, and synchronously reading, by the processor, signals acquired by the p acquisition circuits;
S17: determining whether the system has a fault; if so, performing S11; otherwise, performing S18; and
S18: powering off the system, and terminating debugging.

According to the system debugging fault detection method provided by the invention, during debugging, all the dry contacts are closed, the processor sequentially drives the m driving circuits and reads signals acquired by the p acquisition circuits in real time to recognize the state of the dry contacts; then, all the dry contacts are opened, the same driving and acquisition operations are performed again, and the processor detects and reports details of faults caused by circuit exceptions and cable misconnection based on an analysis of driving and acquisition data.

The invention provides a system running fault detection method for a two-sided time-sharing driving and acquisition system based on dry contacts, comprising the following steps:

S21: powering on the system;
S22: controlling, by a processor, outputs of m driving circuits at different times, and synchronously reading, by the processor, signals acquired by p acquisition circuits, and
S23: determining whether the system has a fault; if the system has no fault, performing S22; or, the system has a fault, reporting the fault to the system.

According to the system running fault detection method provided by the invention, when the system runs, all dry contacts will be closed or opened according to external requirements, and the processor sequentially drives the m driving circuits and continuously acquires values of the p acquisition circuits, and details of faults caused by circuit exceptions or short circuits of cables are monitored and reported in real time based on an analysis of driving and acquisition data.

The dry contacts mentioned in the invention belong to the prior art, and are known by those skilled in the art.

Compared with the prior art, the invention has the following beneficial effects:

According to the invention, the state of input acquisition circuits and cables can be monitored in real time during system debugging or running, so that manual maintenance is reduced, the system can run reliably, and faults caused by exceptions of the acquisition circuits and the cables can be reported in time.

DETAILED DESCRIPTION OF THE EMBODIMENTS

To gain a better understanding of the contents of the invention, the invention will be further described below in conjunction with FIG. 1-FIG. 5 and specific implementations.

This embodiment provides a two-sided time-sharing driving and acquisition system based on dry contacts, comprising k dry contacts, a processor, p acquisition circuits and m driving circuits, wherein the k dry contacts are mutually independent, k, p and m are all positive integers, m≤p, and p=2k; the k dry contacts are mutually independent, the p acquisition circuits are evenly divided into two groups which are separately disposed at two sides of the k dry contacts, and the m driving circuits are separately disposed at the two sides of the k dry contacts.

Figure 2:
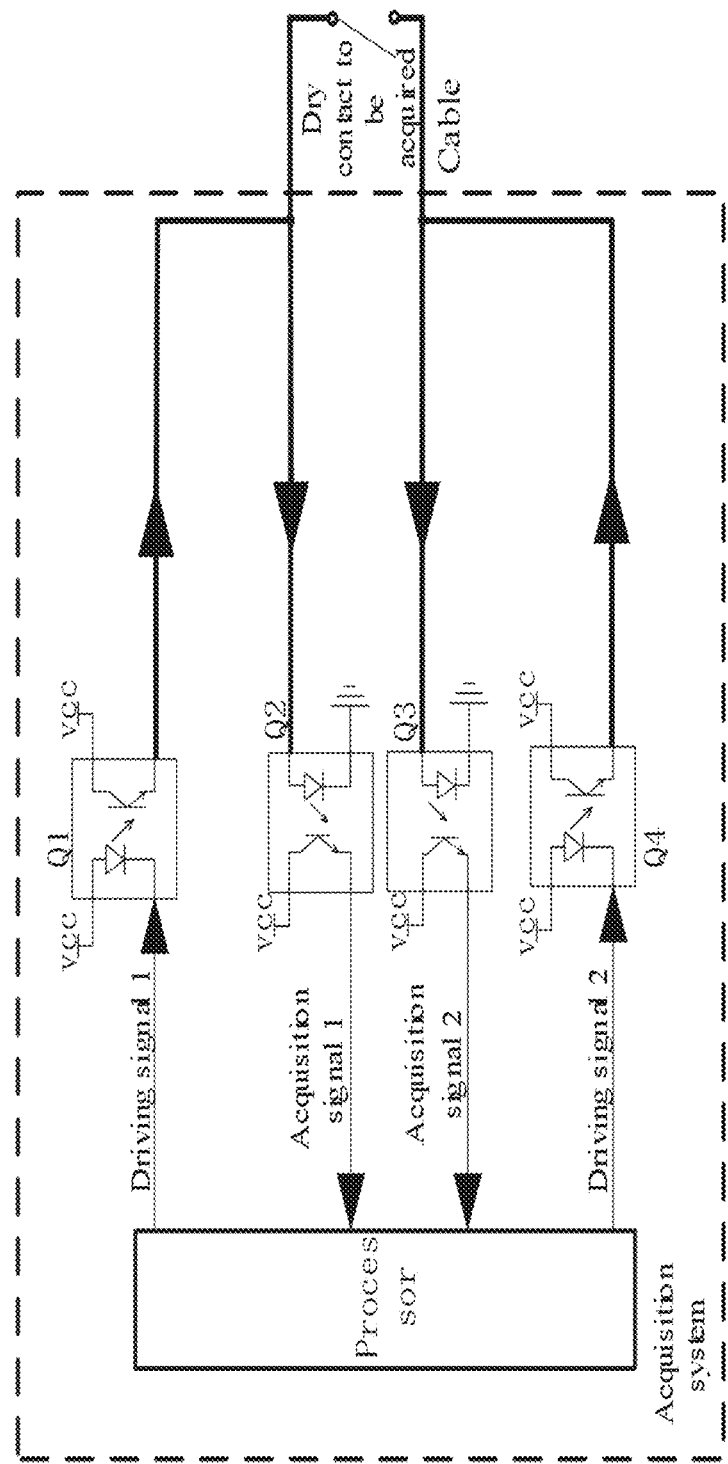
FIG. 2 is an architecture diagram of driving and acquisition circuits of one dry contact in one embodiment.

As shown in FIG. 2, an output of one driving circuit is accessed to each of the two sides of each dry contact, driving signals at the two sides of each dry contact are from two driving circuits separately, and the driving circuits at the two sides of each dry contact do not drive output signals at the same time; one acquisition circuit is connected to each of the two sides of each dry contact, and the two acquisition circuits connected to each dry contact are independent of each other and are used for acquiring output signals of the corresponding driving circuits at the two sides of the dry contact respectively.

The processor controls outputs of the m driving circuits at different times and reads signals acquired by the p acquisition circuits synchronously; if the output signal of the driving circuit at either side of one said dry contact is acquired by the two corresponding independent acquisition circuits, the system determines that the dry contact is in a close state; if the output signal of the driving circuit at either side of one said dry contact is acquired only by the acquisition circuit at the same side, the system determines that the dry contact is in an open state; and in other cases, the system determines that a fault occurs.

Figure 1:
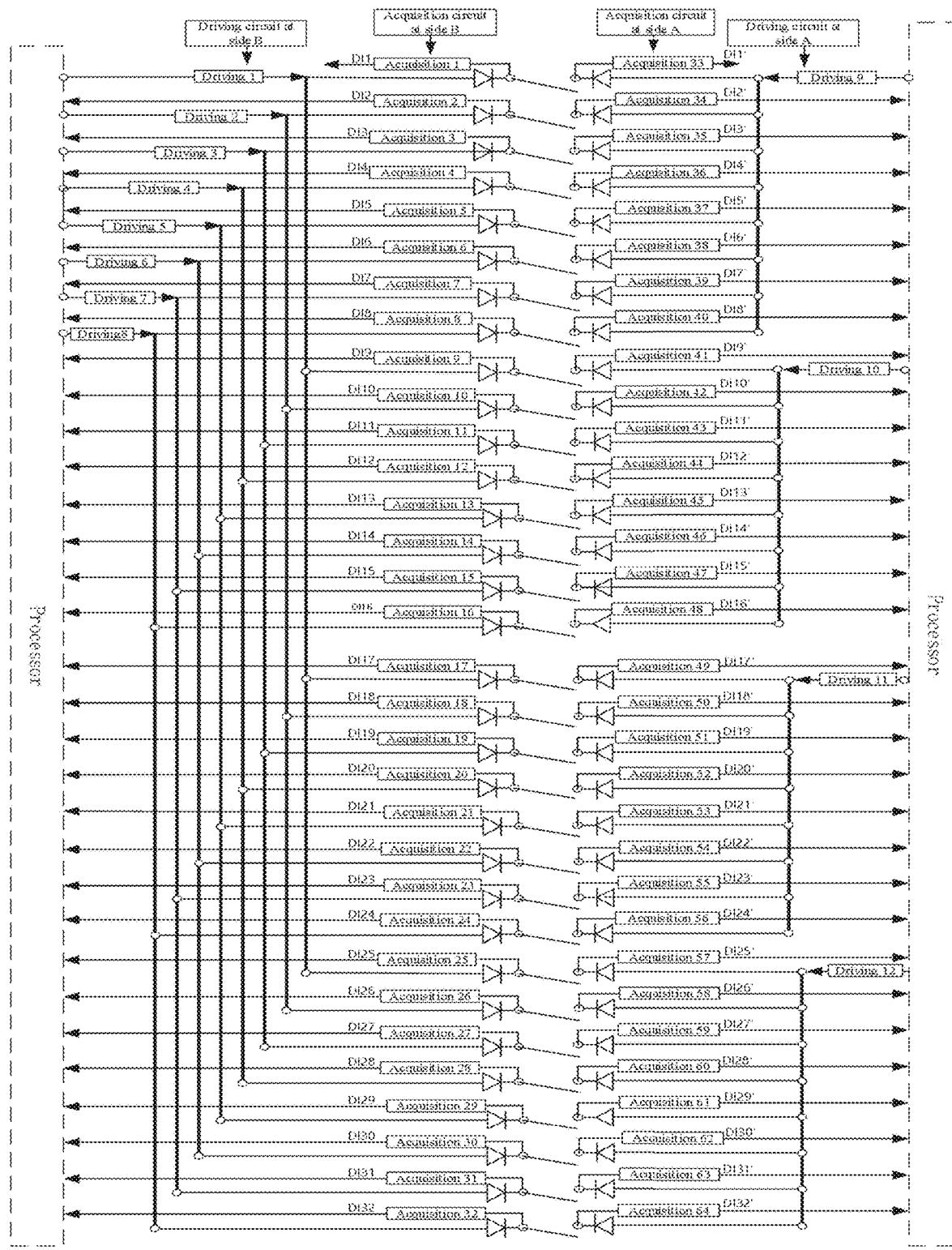
FIG. 1 is an architecture diagram of a driving and acquisition system according to the invention.

As shown in FIG. 1, according to the two-sided time-sharing driving and acquisition system based on dry contacts in this embodiment, the m driving circuits are disposed at the two sides of the k dry contacts, the two sides of the k dry contacts are defined a side A and a side B respectively, a driving circuits are disposed on the side A, b driving circuits are disposed on the side B, and a and b are positive integers; each driving circuit is configured to drive one or more signals to be output, and in a case where one driving circuit outputs a signal, the acquisition circuits connected to the corresponding contact are able to detect the signal output by the driving circuit; and at the side A, if one driving circuit drives x signals to be output at the same time, the driving circuits at the side B of the x dry contacts should be driven separately, that is, any two or more of the x corresponding driving circuits at the side B should not output signals at the same time.

According to the two-sided time-sharing driving and acquisition system based on dry contacts in this embodiment, m is configured to meet a*b≥p. Optionally, m is configured to meet a+b=m.

Figure 3:
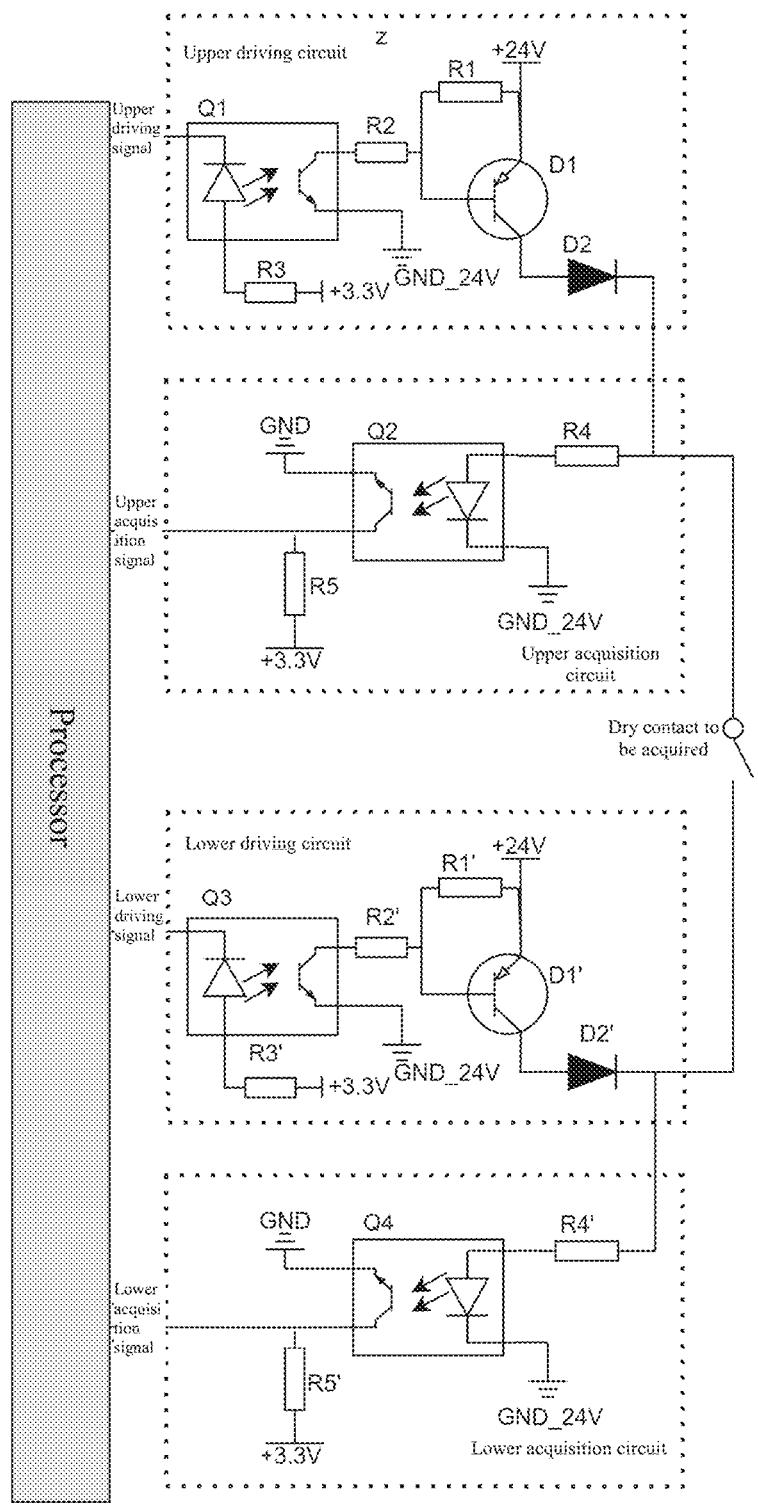
FIG. 3 is a driving and acquisition circuit diagram of one dry contact in one embodiment.

As shown in FIG. 3, the driving circuit in this embodiment comprises an optocoupler Q1, a current-limiting resistor R3, and a power amplification circuit, wherein the optocoupler Q1 is connected to 3.3V after being connected to the current-limiting resistor R3, and the optocoupler Q1 is connected to an acquisition circuit after being connected to a diode D2 in series.

As shown in FIG. 3, to facilitate description, two sides of each dry contact are defined as "upper" and "lower" respectively, that is, the upper driving circuit in FIG. 3 is a driving circuit at one side of the dry contact, the lower driving circuit is a driving circuit at the other side of the dry contact, the upper acquisition circuit is an acquisition circuit at one side of the dry contact, and the lower acquisition circuit is an acquisition circuit at the other side of the dry contact.

As shown in FIG. 3 which illustrates a circuit diagram of one contact for cable misconnection detection of the system, an upper driving signal is used for controlling Q1 to be turned on, and R3 is used for limiting a loop current, so that the current is prevented from being too large, which may otherwise damage an MCU; R1, R2 and Q1 form the power amplification circuit to drive an optocoupler Q2 of the upper/lower acquisition circuit; and the diode D2 is added to protect D1 against reverse breakdown caused by 24V of the upper driving circuit. The circuit system is of a symmetrical structure, and the functions of elements in the lower driving circuit and the lower acquisition circuit are the same as the functions of the elements in the upper driving circuit and the upper acquisition circuit.

As shown in FIG. 3 which illustrates the circuit diagram of one contact for cable misconnection detection of the system in this embodiment, the contact mainly comprises four optocouplers Q1-Q4, wherein Q2 and Q3 are used for acquiring signals, and Q1 and Q4 are used for driving signals. When the system runs normally, Q1 and Q4 sequentially drive the signals at different times. When the signal driven by Q1 is 1, Q2 is used for feedback detection of the signal driven by 1, and an acquired feedback signal is 1; if the relay dry contact to be acquired is in an open state at this moment, the signal acquired by Q3 is 0; if the relay dry contact to be acquired is in a close state at this moment, the signal acquired by Q3 is 1. So, if the truth table of the signals acquired by Q2 and Q3 is 11, the dry contact is closed; or, if the truth table of the signals acquired by Q2 and Q3 is 10, the dry contact is opened. When the signal driven by Q4 is 1, if the truth table of the signals acquired by Q2 and Q3 is 11, the dry contact is closed; or, if the truth table of the signals acquired by Q2 and Q3 is 01, the dry contact is opened.

The working process of one contact for cable misconnection detection in this embodiment is as follows: when the system works, an upper driving signal and a lower driving signal are driven at different times, and the upper acquisition circuit and the lower acquisition circuit continuously acquire signals in real time. When the upper driving signal is valid and the lower driving signal is invalid, the system determines whether the dry contact is closed by acquiring the state of upper and lower acquisition signals; if the upper and lower acquisition signals are both valid, an MCU determines that the dry contact is closed; if the upper acquisition signal is valid and the signal acquired by the lower acquisition signal is invalid, the MCU determines that the dry contact is not closed; and in case of other acquisition states, the MCU determines that a fault happens to the system. When the upper driving signal is invalid and the lower driving signal is valid, if the upper and lower acquisition signals are both valid, the MCU determines that the dry contact is closed; if the upper acquisition signal is invalid and the lower acquisition signal is valid, the MCU determines that the dry contact is not closed; in case of other acquisition states, the MCU determines that a fault happens to the system.

By using the two-sided time-sharing driving and acquisition system based on dry contacts in this embodiment on the spot of industry or in the field of rail transit, where the state signals of a large number of relay dry contacts need to be accurately acquired in real time by the system, extra equipment is not needed, driving and acquisition circuits are added based on an original circuit to monitor faults, and detection can be performed without affecting normal running of the system and stopping the system.

Figure 4:
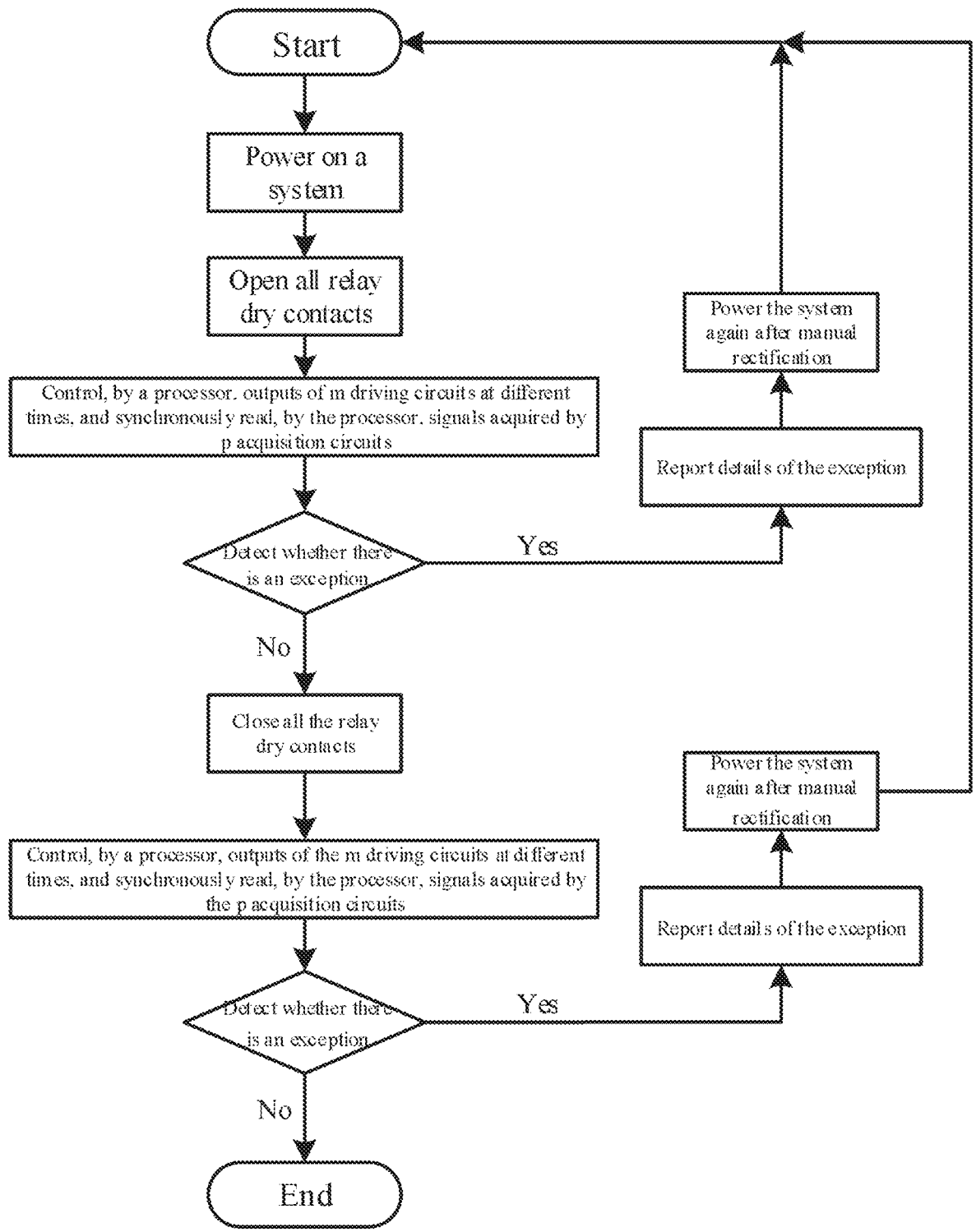
FIG. 4 is a flow block diagram of a system debugging fault detection method in one embodiment.

As show in FIG. 4, this embodiment provides a system debugging fault detection method for a two-sided time-sharing driving and acquisition system based on dry contacts, comprising the following steps:

S11: the system is powered on;

S12: k dry contacts are opened;

S13: a processor controls outputs of m driving circuits at different times and reads signals acquired by p acquisition circuits synchronously;

S14: whether the system has a fault is determined; if so, S11 is performed; otherwise, S15 is performed;

S15: the k dry contacts are closed;

S16: the processor controls outputs of the m driving circuits at different times and reads signals acquired by the p acquisition circuits synchronously;

S17: whether the system has a fault is determined; if so, S11 is performed; otherwise, S18 is performed; and S18: the system is powered off, and debugging is terminated.

Figure 5:
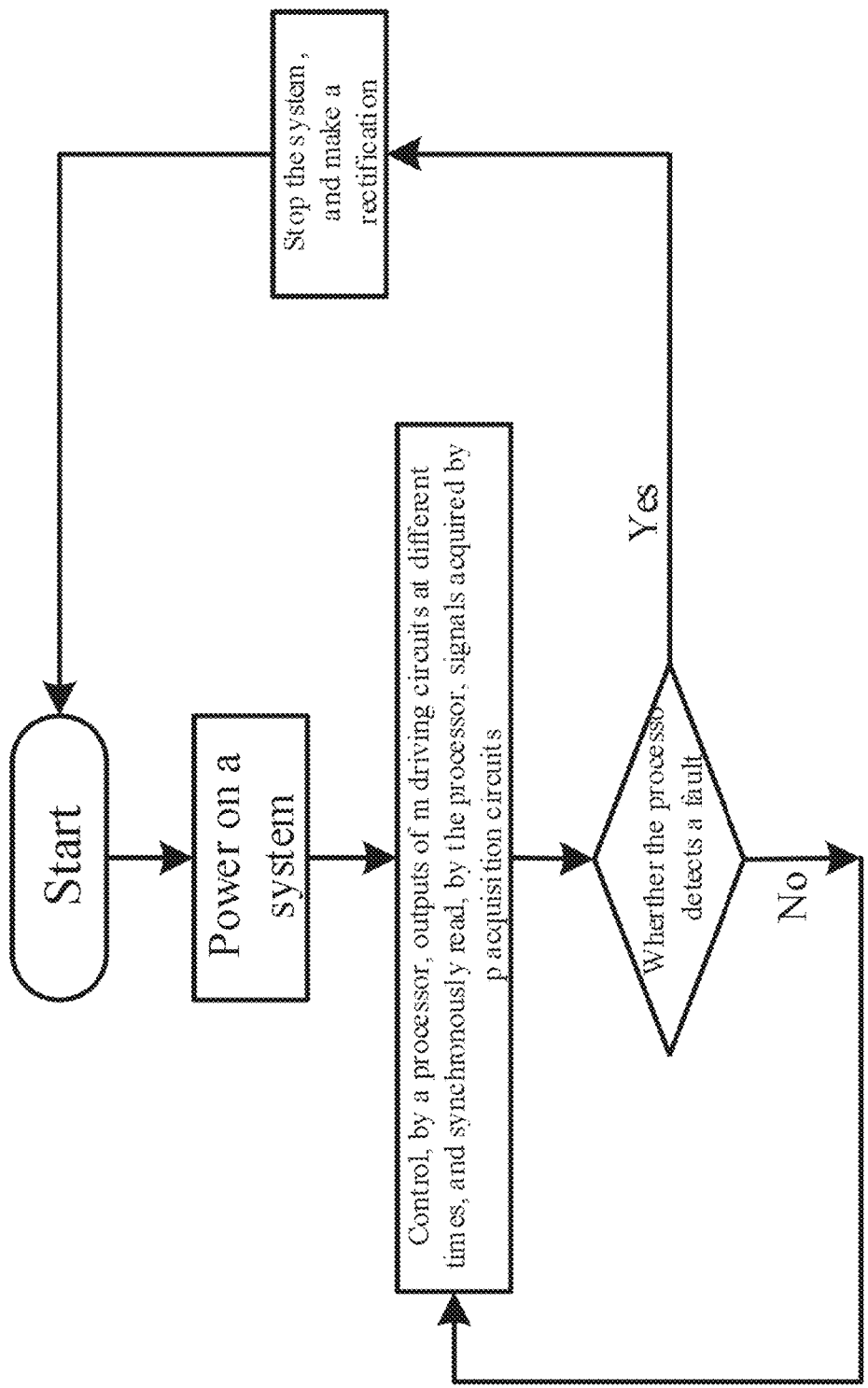
FIG. 5 is a flow block diagram of a system running fault detection method in one embodiment.

As shown in FIG. 5, this embodiment provides a system running fault detection method for a two-sided time-sharing driving and acquisition system based on dry contacts, comprising the following steps:

S21: the system is powered on;

S22: a processor controls outputs of m driving circuits at different times and reads signals acquired by p acquisition circuits synchronously; and S23: whether the system has a fault is determined; if the system has no fault, S22 is performed; or, the system has a fault, the fault is reported to the system.

The system fault detection method in this embodiment has a short detection cycle and high reliability, and the fault location time is controlled within seconds. During debugging, an external device just needs to close all contacts and then open the contacts several seconds later, and manual recognition of faults is not needed; during running, normal work of the original system does not need to be disturbed, and the system alternately detects all contacts in real time to determine whether there is an exception; and after the specific contact of a fault is reported to the system by an algorithm, only the cable at the fault contact reported to the system needs to be checked on the spot. Compared with manual detection, such an automatic high-speed comprehensive detection method improves the detection reliability, can detect all exceptions at a time, and greatly optimizes the production efficiency and system reliability. In the prior art, during field wire debugging, an upper computer is used for recognition, and faults are checked manually; specifically, an external device sequentially closes/opens each relay contact, then the upper computer recognizes whether an acquisition signal of the corresponding contact is consistent with the state of the contact, so as to determine whether the system has a fault; once the upper computer recognizes a wire exception at a certain contact, the specific fault point is located manually, so the workload will be increased in case of a large number of contacts and wires; if the relay contacts are far away from the device, the workload of detection will be amazing, and even, detection cannot be completed by a single person.

The system fault detection method in this embodiment detects system faults online and reports fault information in real time, so that closed operation of acquisition systems is realized, and in case of a fault, other sub-systems will not be affected, and secondary damage to the system is avoided. The defects that, when detection solutions in the prior art are used for detection, the system has to be stopped, and online detection requirements cannot be met are overcome.

EXAMPLE 1

When the system comprises k contacts (for the convenience of description, k=32), driving and acquisition circuits are realized by optocouplers, and it can be figured out that the maximum value of (a+b) is 12, wherein a=4, and b=8 (or, a=6, and b=6).

During system debugging, the specific implementation steps are as follows:

Step 1: the system is powered on, and all relay dry contacts are kept in an open state;

Step 2: the 12 driving optocouplers perform driving sequentially, and the 64 acquisition optocouplers perform acquisition continuously;

Step 3: whether there is a wire misconnection exception is determined according to an algorithm;

Step 4: all the relay dry contacts are kept in a closed state;

Step 5: the 12 driving optocouplers perform driving sequentially, and the 64 acquisition optocouplers perform acquisition continuously;

Step 6: whether there is a wire misconnection exception is determined according to the algorithm;

The description logic of the fault detection algorithm is as follows: if neither of the two sides of one dry contact is driven, when the acquisition signals at one or both sides are 1, a wire at this contact is abnormal, and if the processor reads a dry contact corresponding to the driving signal at the corresponding time, it is determined that a wire at the two dry contacts or the driving and acquisition circuits of the two dry contacts are abnormal; similarly, if the acquisition signals of multiple dry contacts that are not driven are 1, the wire at these dry contacts or the circuits of these contacts are abnormal. If one side of a certain dry contact is driven, that is, the driving signal at this side is 1, when the acquisition signal at this side is 0, it is determined that the driving and acquisition circuits of this contact are abnormal.

During system running, the specific implementation steps are as follows:

Step 1: the system is powered on;

Step 2: the 12 driving optocouplers perform driving sequentially, and the 64 acquisition optocouplers perform acquisition continuously;

Step 3: whether there is a wire misconnection exception is determined according to an algorithm;

The logic of the fault detection algorithm during system running is the same as the fault detection algorithm during system debugging.

Those that are not involved in the invention belongs to the prior art, or may be implemented based on the prior art.

What is claimed is:

1. A two-sided time-sharing driving and acquisition system based on dry contacts, comprising k dry contacts, a processor, p acquisition circuits, and m driving circuits, wherein the k dry contacts are mutually independent, k, p and m are all positive integers, m≤p, and p=2k; the p acquisition circuits are evenly divided into two groups which are separately disposed at two sides of the k dry contacts, and the m driving circuits are separately disposed at the two sides of the k dry contacts;

an output of one of the m driving circuits is accessed to each of the two sides of each of the k dry contacts, driving signals at the two sides of each of the k dry contacts are from two of the m driving circuits separately, and the driving circuits at the two sides of each of the k dry contacts do not drive output signals at a same time; one of the acquisition circuits is connected to each of the two sides of each of the k dry contacts, and two corresponding acquisition circuits connected to each of the k dry contacts are independent of each other and are used for acquiring output signals of corresponding driving circuits at the two sides of the dry contact respectively;

the processor controls outputs of the m driving circuits at different times and reads signals acquired by the p acquisition circuits synchronously; if a given output signal of a given driving circuit at either side of one of the k dry contacts is acquired by the two corresponding acquisition circuits, the system determines that the one of the k dry contacts is in a close state; if the given output signal of a given driving circuit at either side of one of the k dry contacts is acquired only by the acquisition circuit at a same side, the system determines that the dry contact is in an open state; and in other cases, the system determines that a fault occurs.

2. The two-sided time-sharing driving and acquisition system based on the dry contacts according to claim 1, wherein the m driving circuits are disposed at the two sides of the k dry contacts, the two sides of the k dry contacts are defined as a side A and a side B respectively, a driving circuits are disposed on the side A, b driving circuits are disposed on the side B, and a and b are positive integers;

each of the a and b driving circuits is configured to drive one or more signals to be output, and in a case where one of the a and b driving circuits outputs a signal, acquisition circuits connected to a corresponding dry contact are able to detect the signal output by the one of the a and b driving circuits;

at the side A, if one of the a driving circuits drives x signals to be output at x dry contacts at a same time, driving circuits, of the b driving circuits, at the side B of the x dry contacts should be driven separately.

3. The two-sided time-sharing driving and acquisition system based on the dry contacts according to claim 2, wherein m is configured to meet a*b≥p.

4. The two-sided time-sharing driving and acquisition system based on the dry contacts according to claim 2, wherein m is configured to meet a+b=m.

5. A system debugging fault detection method for the two-sided time-sharing driving and acquisition system based on the dry contacts according to claim 1, comprising the following steps:

S11: powering on the system;

S12: opening the k dry contacts;

S13: controlling, by the processor, outputs of the m driving circuits at different times, and synchronously reading, by the processor, signals acquired by the p acquisition circuits;

S14: determining whether the system has a fault; if so, performing S11; otherwise, performing S15;

S15: closing the k dry contacts;

S16: controlling, by the processor, outputs of the m driving circuits at different times, and synchronously reading, by the processor, signals acquired by the p acquisition circuits;

S17: determining whether the system has a fault; if so, performing S11; otherwise, performing S18; and S18: powering off the system, and terminating debugging.

6. The system debugging fault detection method according to claim 5, wherein the m driving circuits are disposed at the two sides of the k dry contacts, the two sides of the k dry contacts are defined as a side A and a side B respectively, a driving circuits are disposed on the side A, b driving circuits are disposed on the side B, and a and b are positive integers;

each of the a and b driving circuits is configured to drive one or more signals to be output, and in a case where one of the a and b driving circuits outputs a signal, acquisition circuits connected to a corresponding dry contact are able to detect the signal output by the one of the a and b driving circuits;

at the side A, if one of the a driving circuits drives x signals to be output at x dry contacts at a same time, driving circuits, of the b driving circuits, at the side B of the x dry contacts should be driven separately.

7. The system debugging fault detection method according to claim 6, wherein m is configured to meet a*b≥p.

8. The system debugging fault detection method according to claim 6, wherein m is configured to meet a+b=m.

9. A system running fault detection method for the two-sided time-sharing driving and acquisition system based on the dry contacts according to claim 1, comprising the following steps:

S21: powering on the system;

S22: controlling, by the processor, outputs of the m driving circuits at different times, and synchronously reading, by the processor, signals acquired by the p acquisition circuits; and S23: determining whether the system has a fault; if the fault is not present, performing S22; or, if the fault is present, reporting the fault to the system.

10. The system running fault detection method according to claim 9, wherein the m driving circuits are disposed at the two sides of the k dry contacts, the two sides of the k dry contacts are defined as a side A and a side B respectively, a driving circuits are disposed on the side A, b driving circuits are disposed on the side B, and a and b are positive integers;
- each of the a and b driving circuits is configured to drive one or more signals to be output, and in a case where one of the a and b driving circuits outputs a signal, acquisition circuits connected to a corresponding dry contact are able to detect the signal output by one of the a and b driving circuits;
- at the side A, if one of the a driving circuits drives x signals to be output at x dry contacts at a same time, driving circuits, of the b driving circuits, at the side B of the x dry contacts should be driven separately.

11. The system running fault detection method according to claim 10, wherein m is configured to meet $a*b \geq p$.

12. The system running fault detection method according to claim 10, wherein m is configured to meet $a+b=m$.

* * * * *